United States Patent Office 2,740,776
Patented Apr. 3, 1956

2,740,776

ORGANIC ACID ESTERS OF CELLULOSE

Leonard J. Rosen, East Orange, Adam J. Pikor, Springfield, and Blanche B. White, Summit, N. J., assignors to Celanese Corporation of America, New York, N. Y., a corporation of Delaware No Drawing. Application January 10, 1952,
Serial No. 265,918

2 Claims. (Cl. 260—227)

This invention relates to organic acid esters of cellulose and is particularly concerned with a process for the production of organic acid esters of cellulose in the form of fibrous flakes having a high bulk density.

In the production of organic acid esters of cellulose, the esterification is usually carried out by contacting cellulose, generally after suitable pretreatment, with an organic acid anhydride in the presence of an acid esterification catalyst, such as sulfuric acid, and a lower aliphatic acid solvent for the ester being formed. The solution obtained upon the completion of the esterification will be referred to hereinafter as an "acid dope." Following the completion of the esterification, water is added to the acid dope to convert any remaining organic acid anhydride to the corresponding acid, and the organic acid ester of cellulose, usually after the addition of a further quantity of water, is hydrolyzed or ripened to impart the desired solubility characteristics thereto. The organic acid ester of cellulose is then precipitated by the addition of water or a dilute aqueous solution of a lower aliphatic acid to the acid dope, washed, stabilized if necessary, washed again and finally dried. It is desirable that the organic acid ester of cellulose be precipitated in the form of a fibrous flake to facilitate the access of water to all portions thereof during the washing steps, and that the said flake have a high bulk density to simplify subsequent processing operations.

According to a prior process, when it is desired to produce an organic acid ester of cellulose of improved clarity and freedom from haze, and especially suited for the production of films, molded articles and the like, at least a portion of the acid esterification catalyst is neutralized with an alkaline material that will react with the catalyst to form a salt difficultly soluble in the acid dope and which will precipitate therefrom. The acid dope is then filtered to remove therefrom the salt crystals as well as gels, fibers, and other foreign particles. It has been found that when the organic acid ester of cellulose is precipitated from the filtered acid dope in a manner which yields a fibrous flake, the latter has a low bulk density, usually below 0.20 grams per cubic centimeter, so that the subsequent processing operations carried out thereon, such as grinding, roll-working and the like, are more time-consuming. When attempts are made to increase the bulk density of the flake by modifying the precipitating conditions there is a tendency toward the formation of a soft pellet or powder or small friable fiber which are relatively difficult to wash.

It is an important object of this invention to provide a process for the production of organic acid esters of cellulose which will be free from the foregoing and other difficulties and which will be especially simple and efficient in operation.

A further object of this invention is to provide a process for the precipitation of organic acid esters of cellulose from a filtered acid dope in the form of a fibrous flake of high bulk density.

Another object of this invention is the provision of a process for the precipitation of organic acid esters of cellulose from a filtered acid dope with an aqueous medium containing a dissolved salt.

Other objects of this invention will be apparent from the following detailed description and claims.

It has now been found that organic acid esters of cellulose may be precipitated from filtered acid dopes in the form of fibrous flakes having a high bulk density by mixing the said dopes with an aqueous precipitating medium containing a dissolved salt. The presence of the dissolved salt in the aqueous precipitating medium influences the precipitation of the organic acid ester of cellulose in such manner as to permit the production of a fibrous flake of high bulk density which may be easily washed and which lends itself readily to subsequent processing operations.

According to the present invention, a cellulosic material, usually after a suitable pretreatment, is esterfied with an organic acid anhydride in the presence of an acid esterification catalyst, such as sulfuric acid, and a lower aliphatic acid solvent, such as acetic, propionic or butyric acid or mixtures thereof, for the organic acid ester of cellulose being formed. Water is then added to the acid dope to convert any remaining organic acid anhydride to the corresponding acid. The organic acid ester of cellulose, after the addition to the acid dope of a further quantity of water, is hydrolyzed or ripened to impart the desired solubility characteristics thereto. At least a portion or all of the acid esterification catalyst is neutralized with an alkaline material with which it forms a salt difficultly soluble in the acid dope. The neutralization of the acid catalyst may take place before or after the hydrolysis or ripening of the organic acid ester of cellulose depending upon the precise manner in which the said hydrolysis or ripening is carried out. The acid dope is then filtered to remove therefrom the salt crystals, as well as any gels, fibers and the like. Following the filtration, the organic acid ester of cellulose is precipitated from the acid dope by mixing the same with an equeous precipitating medium such as water or a dilute aqueous lower aliphatic acid solution containing a dissolved salt. The precipitated organic acid ester of cellulose is obtained in the form of a fibrous flake of high bulk density which may be easily washed and which lends itself readily, following the completion of washing and drying, to subsequent processing operations.

In carrying out the esterificaiton of the cellulosic material, there may be employed any of the known acid esterification catalysts, but sulfuric acid is preferred. To neutralize the acid esterification catalyst, any alkaline material capable of forming a salt difficultly soluble in the acid dope may be employed. Suitable alkaline materials for this purpose include, for example, magnesium acetate, magnesium propionate and magnesium butyrate, sodium acetate, sodium propionate. The alkaline material may be added to the acid dope in solution in water or aqueous lower aliphatic acid and may, if desired, be included in the water added to the acid dope to convert the unreacted organic acid anhydride to the corresponding acid and to provide water for the hydrolysis or ripening of the organic acid ester of cellulose. Following completion of the hydrolysis or ripening, the acid dope may be diluted with an aqueous lower aliphatic acid under conditions favorable to the growth of salt crystals having a structure which will permit the rapid filtration of the acid dope. The acid dope is then filtered to remove therefrom the salt crystals, gels, fibers and other impurities which may be present therein.

The filtered acid dope, which is substantially free from salts and which is also free from acid esterification catalyst in those cases where all of said acid catalyst is neutralized, is then mixed with an aqueous precipitating medium containing a dissolved salt to precipitate therefrom the organic acid ester of cellulose. Aqueous precipitating media which may be employed for this purpose include, for example, water itself, but it is preferred to use a dilute aqueous lower aliphatic acid such as acetic acid, propionic acid or butyric acid having a concentration of between about 5 and 15%. Any salt soluble in the aqueous precipitating medium may be added thereto to assist in obtaining an organic acid ester of cellulose in the form of a fibrous flake having a high bulk density since the presence of the salt seems to permit the production of the desired results without any chemical reaction taking place with the organic acid ester of cellulose. Best results have been obtained with the use of inorganic salts and particularly inorganic salts which will ionize to produce polyvalent ions. Suitable salts include, for example, magnesium sulfate, sodium sulfate, magnesium acetate, calcium acetate and magnesium nitrate. In the interests of economy, the salt added to the aqueous precipitating medium may be the salt which was removed from the acid dope during the filtration step. The salt may be added to the aqueous precipitating medium in amounts of from about 5 to 25% by weight, based on the weight of the organic acid ester of cellulose being precipitated, and may be included with the whole of the aqeous precipitating medium mixed with the acid dope or simply in the first fraction thereof. The aqueous precipitating medium may be employed at room temperatures, but is advantageously employed at temperatures of between about 20 and 80° C.

The present invention will now be described specifically in connection with the production of cellulose acetate, which is commercially the most important organic acid ester of celulose at the present time. It may, however, also be employed in the production of other organic acid esters of cellulose such as cellulose propionate, cellulose butyrate, cellulose acetate propionate, cellulose acetate butyrate, cellulose acetate stearate and the like.

*Example*

Cellulose is esterified with acetic anhydride in the presence of sulfuric acid as an esterification catalyst and acetic acid as a solvent. An aqueous solution of magnesium acetate is added to the acid dope in an amount sufficient to convert all the remaining acetic anhydride to acetic acid, to provide a small excess of water, and to neutralize all the sulfuric acid. The acid dope is ripened at 85° C. until the cellulose acetate has an acetyl value of 54%, calculated as acetic acid, and the dope is diluted with 10% aqueous acetic acid until it has, by analysis, about 15% cellulose acetate, 28% water and 57% acetic acid and the dope is filtered. The cellulose acetate is then precipitated at a temperature of 50° C. with 10% aqueous acetic acid, employing 150 parts of the aqueous acetic acid for each 100 parts of the acid dope. This is effected by the slow addition to the filtered dope of 35% by weight of the 10% aqueous acetic acid containing 10% by weight of magnesium sulfate, followed by the rapid addition of a further 65% by weight of the 10% aqueous acetic acid containing no magnesium sulfate. The cellulose acetate precipitates in the form of long fibers that may be easily washed and that have a bulk density of 0.31 gram per cubic centimeter (dry).

When the same acid dope is precipitated in the absence of the magnesium salt, the cellulose acetate is obtained in the form of short, powdery fibers that cannot be easily washed and that have a bulk density of only 0.12 gram per cubic centimeter (dry).

It is to be understood that the foregoing detailed description is given merely by way of illustration and that many variations may be made therein without departing from the spirit of our invention.

Having described our invention, what we desire to secure by Letters Patent is:

1. In a process for the production of organic acid esters of cellulose wherein a cellulosic material is esterified in the presence of an acid esterification catalyst and a lower aliphatic acid solvent for the organic acid ester of cellulose being formed whereby an acid dope is obtained, the steps which comprise neutralizing at least a part of the acid esterification catalyst with an alkaline material, selected from the group consisting of magnesium acetate, magnesium propionate and magnesium butyrate, which will react with the catalyst to produce a salt difficultly soluble in the acid dope, filtering the acid dope whereby all of the salt is removed therefrom, and mixing the salt-free acid dope with an aqueous precipitating medium, containing therein a dissolved salt, selected from the group consisting of magnesium sulfate, sodium sulfate, magnesium acetate, calcium acetate and magnesium nitrate, whereby the organic acid ester of cellulose is precipitated from the acid dope in the form of a fibrous flake having a high bulk density.

2. In a process for the production of cellulose acetate wherein a cellulosic material is esterified with acetic anhydride in the presence of sulfuric acid as catalyst and acetic acid as solvent for the cellulose acetate being formed whereby an acid dope is obtained, the steps which comprise neutralizing at least a part of the sulfuric acid with an alkaline material, selected from the group consisting of magesium acetate, magesium propionate and magnesium butyrate, which will react with the catalyst to produce a salt difficulty soluble in the acid dope, filtering the acid dope, whereby all of the salt is removed therefrom and mixing the salt-free acid dope with an aqueous precipitating medium containing a dissolved salt, selected from the group consisting of magnesium sulfate, sodium sulfate, magesium acetate, calcium acetate and magnesium nitrate, whereby the cellulose acetate is precipitated from the acid dope in the form of a fibrous flake having a high bulk density.

References Cited in the file of this patent

UNITED STATES PATENTS

| 1,860,461 | Hubert | May 31, 1932 |
| 1,936,189 | Dreyfus | Nov. 21, 1933 |

FOREIGN PATENTS

| 574,106 | Great Britain | Dec. 20, 1945 |

U. S. DEPARTMENT OF COMMERCE
PATENT OFFICE
CERTIFICATE OF CORRECTION

Patent No. 2,740,776                      April 3, 1956

Leonard J. Rosen et al.

It is hereby certified that error appears in the printed specification of the above numbered patent requiring correction and that the said Letters Patent should read as corrected below.

Column 2, line 47, for "esterificaiton" read --esterification--; lines 54 and 55, strike out ", sodium acetate, sodium propionate"; column 4, line 41, for "magesium acetate, magesium" read --magnesium acetate, magnesium--.

Signed and sealed this 15th day of April 1958.

(SEAL)
Attest:
KARL H. AXLINE

Attesting Officer

ROBERT C. WATSON
Commissioner of Patents